United States Patent

[11] 3,589,392

[72] Inventor Louis C. Meyer
 Box 434, Rte. 1, Morrison, Colo. 80465
[21] Appl. No. 821,808
[22] Filed May 5, 1969
[45] Patented June 29, 1971

[54] SPLIT LEAFLET CHECK VALVE FOR CARDIAC SURGERY AND THE LIKE
8 Claims, 5 Drawing Figs.

[52] U.S. Cl. ........................... 137/525.1, 3/1
[51] Int. Cl. ........................... F16k 15/14
[50] Field of Search ........................... 137/525.1, 525.3, 527; 3/DIG. 3

[56] References Cited
UNITED STATES PATENTS
586,618 7/1897 Noll ........................... 137/527
2,822,819 2/1958 Geeraert ........................... 137/525.1
3,131,712 5/1964 Risley et al. ........................... 137/525.1 X FOREIGN PATENTS
9,095 1879 Germany ........................... 137/527

Primary Examiner—Robert G. Nilson
Attorney—John E. Reilly

ABSTRACT: A check valve for cardiac surgery and the like has a hollow valve body supporting a split leaflet divided into separable portions hinged for swinging movement from the base thereof between a normally closed position and an open position wherein the leaflet forms a continuation of one end of the hollow body. Inturned edges of the separable leaflet portions converging from the body are in a sealed engagement with a seat on the body and terminate in longitudinal edges which are in a sealed engagement to one another in the normally closed position.

PATENTED JUN29 1971  3,589,392

INVENTOR.
Louis C. Meyer
BY John E. Reilly
ATTORNEY

SPLIT LEAFLET CHECK VALVE FOR CARDIAC SURGERY AND THE LIKE

This invention relates to check-type valves and more particularly to novel and improved check valves for cardiac surgery and the like.

One of the more common human ailments is the failure of one or more valves in the heart. Cardiac surgery is now fairly common medical practice and a variety of forms of valves has heretofore been used to replace the defective mitral or aortal valves in the human heart such as for instance the ball and cage type and a variety of leaflet valves including the center-hinged leaflet valve. Certain difficulties and problems have attended the use of presently known artificial heart valves including damage to blood cells, clotting, backflow leakage, a poor mixture of white and red corpuscles; and in general prior artificial heart valves have not accurately simulated the functioning, simplicity and level of performance of the human heart valve.

Accordingly, it is an object of this invention to provide a compact, lightweight and reliable check valve for cardiac surgery and the like which will accurately simulate the functioning of a human valve on either the aortal or mitral side of the heart.

It is another object of this invention to provide a novel and improved check valve for movement between a normally closed and open position having highly sensitive, longitudinally split leaflet members.

In accordance with the present invention, I provide a check valve including a hollow valve body adapted for mounting in a fluid flow passage which supports a split leaflet having separable portions supported at the base thereof for swinging movement. The separable leaflet portions are generally arcuate in cross section and have inturned sealing edges which converge from the outer sides on the leaflet and seal against a seat on the valve body; the convergent edges terminate in longitudinal sealing edges which engage one another in the closed position. The separable leaflet portions pivot away from one another to provide generally parallel inner wall surfaces which form longitudinal continuations of inner wall surfaces of the hollow valve body for smooth laminar flow therethrough.

The above and other objects, advantages and capabilities of the present invention will become more readily understood from a consideration of a detailed description in conjunction with the accompanying drawings, in which.

Figure 1:
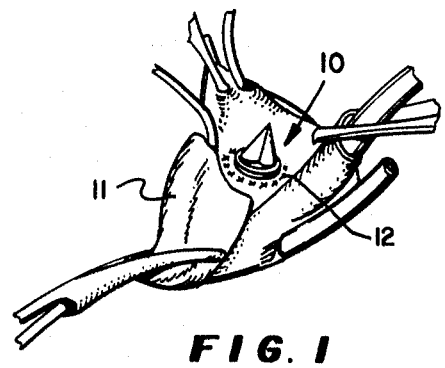
FIG. 1 is a fragmentary perspective view of a check valve embodying features of the present invention shown as mounted as a mitral valve in a passage of a heart.

With reference now to the drawings a check valve 10 is illustrated in FIG. 1 as being mounted in a passage in the wall of the heart 11 and secured thereto by sutures 12. This valve is readily adapted as an aortal valve and would extend through the passage of the heart in the opposite direction. While the valve shown and described herein has particular advantages when used as an artificial heart valve, it is understood that it is also suited for other flow control applications, such as for cryogenic fluids, an aerosol valve for paint spraying applications and the like.

The check valve 10 as shown for installation in a heart has an outer hollow valve body or housing 13 provided with a peripheral flanged portion 14 against which a suitable suture cloth 15 is secured. The suture cloth 15 is fitted against the upper ledge of the flange and extends along the outer wall of the valve body and projects outwardly from the flange. It is held in place by an outer resilient band 16 which firmly grips the inner edge of the cloth to hold it against the valve body 13. The suture cloth is then sewn or sutured into the heart wall as shown in FIG. 1 to hold the valve in place.

The hollow body 13 supports or provides a base for a split leaflet-type structure 21 composed of a pair of oppositely disposed separable leaflet portions 22 and 23 which extend from one end of the body in the direction of flow and function to regulate flow therethrough. These portions 22 and 23 move between a normally closed position shown in full lines and an open position 22a and 23a indicated in dash lines.

Figure 2:
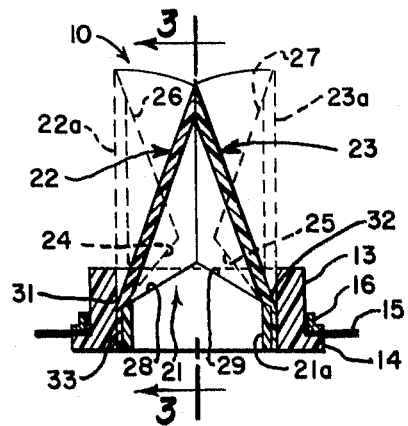
FIG. 2 is a vertical cross-sectional view of the valve of FIG. 1 having a suture cloth secured thereto, the separable leaflet portions being shown in full lines in the closed position and in dashed lines in the open position.

In profile the separable leaflet portions 22 and 23 as best shown in FIG. 2 have inturned sealing lips or terminal edges, 24 and 25, respectively, which converge from the inner wall surfaces of the valve body and terminate in longitudinal sealing lips or sealing edges 26 and 27, respectively. In the closed position the convergent edges 24 and 25 are disposed in a sealed relation with an adjacent valve seat on the valve body having reversely inclined bevelled edges 28 and 29 and the longitudinal edges 26 and 27 are in a sealed relation to one another. These sealing edges may be further characterized as being defined by the removal of a generally Y-shaped section across a generally hollow thin-walled cylindrical body. In this manner the separable leaflet portions 22 and 23 define a generally Y-shaped parting line with one another and with the valve seat.

As above described the separable leaflet portions 22 and 23 will normally contact each other centrally and longitudinally of the valve body 13 with the sealing edges in sealed engagement with one another and the seat. The longitudinal sealing edges 26 and 27 may also be characterized as curved along their length defined by the cut of a plane through a thin-walled hollow cylinder inclined at an acute angle to the axis thereof to intersect the wall of the cylinder at one end. In turn the convergent edges 24 and 25 may also be characterized as curved along their length defined by the cut of a plane through the same cylinder reversely inclined to that of the longitudinal edges which intersect the cylinder at the other end.

Figure 4:
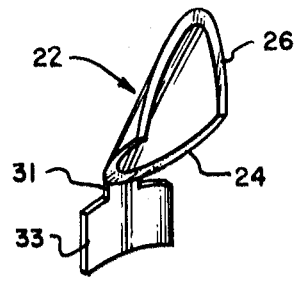
FIG. 4 is a perspective view of one of the separable leaflet portions shown in FIGS. 1, 2 and 3 as detached from the hollow valve body.
Figure 5:
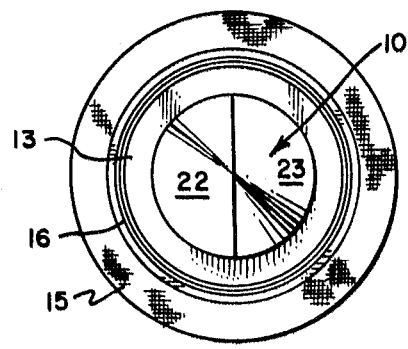
FIG. 5 is a top plan view of the closed valve shown in FIG. 2.
Figure 3:
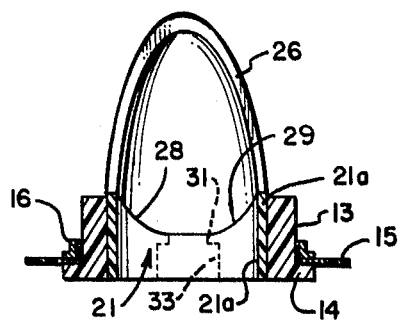
FIG. 3 is a sectional view taken along lines 3-3 of FIG. 2 passing between the longitudinal sealing edges of the split leaflet.

Each separable leaflet portion is similar in size and shape and with reference to leaflet portion 22 has a relatively narrow hinge section 31 which forms a continuation of the associated convergent sealing edge and are attached to the valve body 13 so that the separable portions are supported for a swinging movement. The hinged sections are disposed at diametrically opposed positions with respect to one another. As best shown in FIG. 4 with reference to leaflet portion 22 the preferred construction which facilitates the attachment of the separable leaflet portions within the valve body has a base section 33 of generally arcuate or curved cross section forming a broader continuation of the hinged section 31. An insertable ring 21a fits into the valve body and engages the base sections and holds them in a friction fitting relationship in an opposed relation to one another. Ring 21a is beveled at the inner end to form the seat above described and once in place the ring may be secured so as to be an integral part of the valve body and forms a portion of the inner wall surface of the flow passage for the valve.

A preferred construction is to mold each separable leaflet portion, its associated hinge section and base section as an integral body from a plastic resin material using a living-type hinge construction. In the formation of the living hinge the molecular structure is broken or altered at the hinge section so as to incline the separable portion inwardly to the closed position shown but it will swing outwardly to the open position shown in dashed lines under the opening pressure of the fluid flow against the inner facing surfaces of the separable leaflet portions. While the living hinge is preferred, it is apparent that other conventional hinge structures using elastic or elastomeric material such as a silicon are also suitable.

The separable leaflet portions 22 and 23 will pivot away from each other through a relatively small angle on the order of 26° where the inner cylindrical wall surfaces of the leaflets are generally parallel to one another and are essentially extensions of the inner ring 21a. In the preferred construction shown about two-thirds of the separable leaflet portions will project beyond the outer valve body 13. The cross section of the valve body and its inner passage will conform to the cross section of the leaflet and both are illustrated as being annular or circular to fit the usual circular passage in the heart or in the typical circular conduit. In the open position the internal diameter of the hollow body 13 and the leaflets are the same so that in essence the inner wall surfaces are a part of a common hollow cylinder to provide a smooth laminar flow therethrough.

The leaflet may be composed of various materials which will insure quiet positive sealing action of the sealing edges thereof against one another and against the seat with a rapid response to reversal of flow. It has been found that the particular leaflet construction shown herein more closely simulates the action of the human heart.

It is therefore to be understood that various modifications and changes may be made in the specific construction and arrangement of parts comprising the preferred and modified forms of the present invention without departing from the spirit thereof.

I claim:

1. A heart valve for cardiac surgery comprising a hollow, cylindrical valve body provided with an inner, beveled valve seat having oppositely disposed reversely inclined edges facing in the direction of flow, an annular split leaflet supported by the valve body having a pair of oppositely disposed separable portions extending from one end of the body in the direction of flow, hinge means at the valve seat for supporting said separable portions along the inner side portions of said valve body, said hinge means for each separable portion including a relatively narrow section of resilient material and a base section forming a broader continuation of the hinge means to secure each separable portion from within the valve body, said separable portions having sealing edges converging in the direction of flow extending along the reversely inclined edges of the valve seat and terminating in longitudinal sealing edges at the free ends thereof, said separable portions swinging between a normally closed position with the longitudinal and sealing edges in sealed relation to the valve seat and to one another, respectively, and an open position with the inner wall surface of the separable portions defining a longitudinal continuation of the inner wall surfaces of the valve body.

2. In a check valve for controlling fluid flow through a passage, a hollow base and separable leaflet portions supported for swinging movement relative to the base, said leaflet portions having convergent sealing edges extending from and along the base and terminating in longitudinal sealing edges between the free ends thereof, said separable portions being movable between an open position defining a longitudinal continuation of the base to a normally closed position with said convergent edges of the separable portions in sealed relation against the base and said longitudinal edges in sealed relation to one another, said leaflet portions having relatively narrow hinge sections forming continuations of the convergent sealing edges and being diametrically opposed to one another, said hinge sections being composed of a yieldable material of a molecular structure to form a living-type hinge biasing the separable leaflet portions in the closed position.

3. In a check valve for controlling fluid flow through a passage, a hollow base and separable leaflet portions supported for swinging movement relative to the base, said leaflet portions having convergent sealing edges extending from and along the base and terminating in longitudinal sealing edges between the free ends thereof, said separable portions being movable between an open position defining a longitudinal continuation of the base to a normally closed position with said convergent edges of the separable portions in sealed relation against the base and said longitudinal edges in sealed relation to one another, each said leaflet portion having a relatively narrow flexible hinge section forming a continuation of the convergent sealing edge and a base section forming a broader continuation of the hinge section secured along said base to dispose said leaflet portions diametrically opposed to one another.

4. In a check valve as set forth in claim 3 wherein each said hinge section is made of a molded plastic material with said leaflet portions preset to the closed position.

5. In a check valve as set forth in claim 3 wherein said longitudinal sealing edges and said convergent sealing edges are curved, characterized by the cutting of reversely inclined intersecting longitudinal planes through the center of a hollow, thin-walled cylinder to define a Y-shaped parting line.

6. In a check valve as set forth in claim 3 wherein said base and leaflet portions are defined by a part of a hollow cylinder having a generally Y-shaped section through the cylinder removed defining a generally Y-shaped parting line with one another and with a transverse inclined inner edge of the base.

7. A check valve for controlling fluid flow passage, an annular valve body provided with a circular beveled valve seat having reversely inclined edges transversely of the direction of flow, a split leaflet supported by the body having arcuate separable portions hinged at the valve seat for extension from one end of the body in the direction of fluid flow, said separable portions having convergent sealing edges extending from opposite sides of the valve body along the valve seat and terminating in longitudinal sealing edges, said sealing edges being disposed along a Y-shaped parting line in a direction longitudinally of said body, said separable portions being movable to a normally closed position with the longitudinal and convergent sealing edges in sealed relation to said inclined edges of the valve seat and to one another, respectively, and an open position defining longitudinal extension of the inner wall surfaces of said valve body.

8. A check valve as set forth in claim 7 wherein each said leaflet portion has a relatively narrow flexible hinge section forming a continuation of the convergent sealing edge and a base section forming a broader continuation of the hinge section secured along the body to dispose said leaflet portions diametrically opposed to one another.